July 28, 1931. A. W. BELL ET AL 1,816,202
PACKAGING METHOD AND APPARATUS
Filed July 14, 1928 7 Sheets-Sheet 1
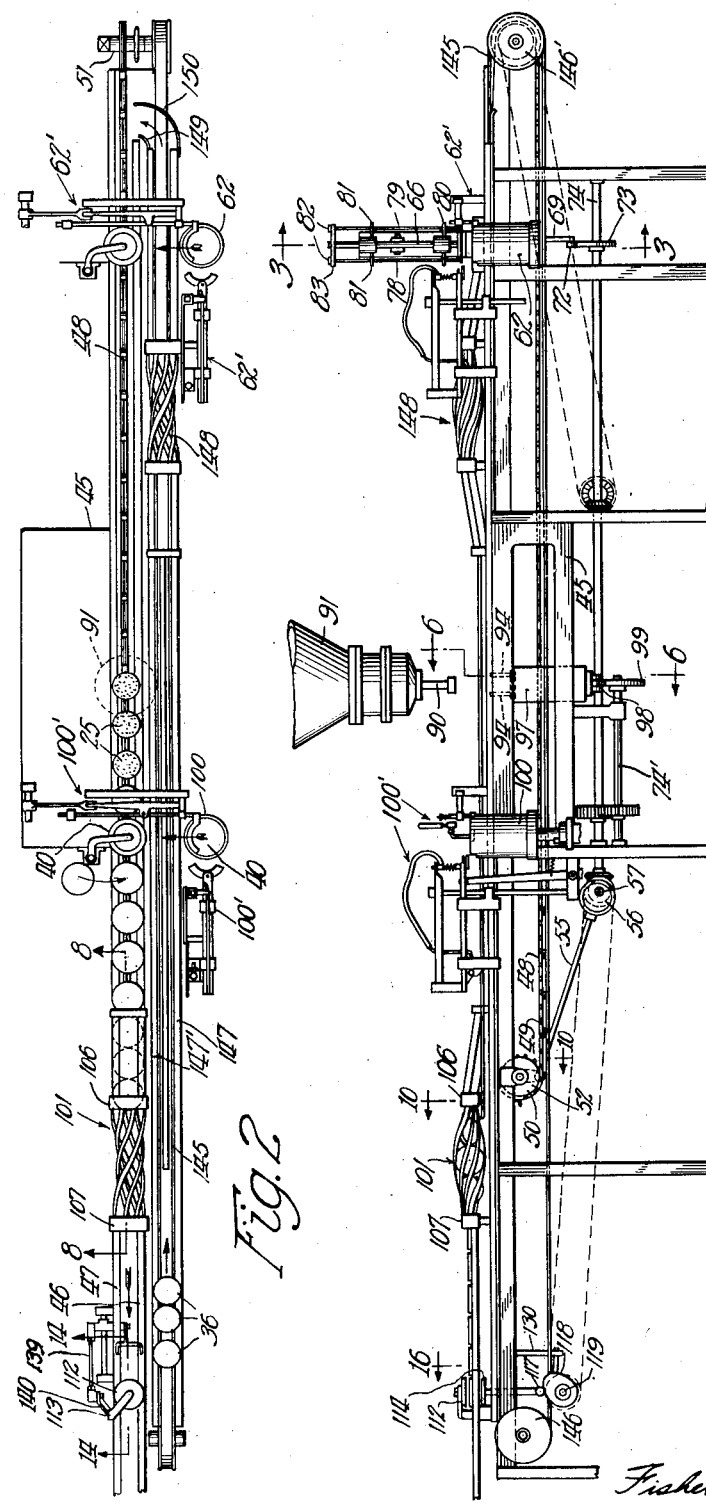
Inventors
Arthur W. Bell
Elmer E. Eldredge
Fisher, Clapp, Soans & Phillips

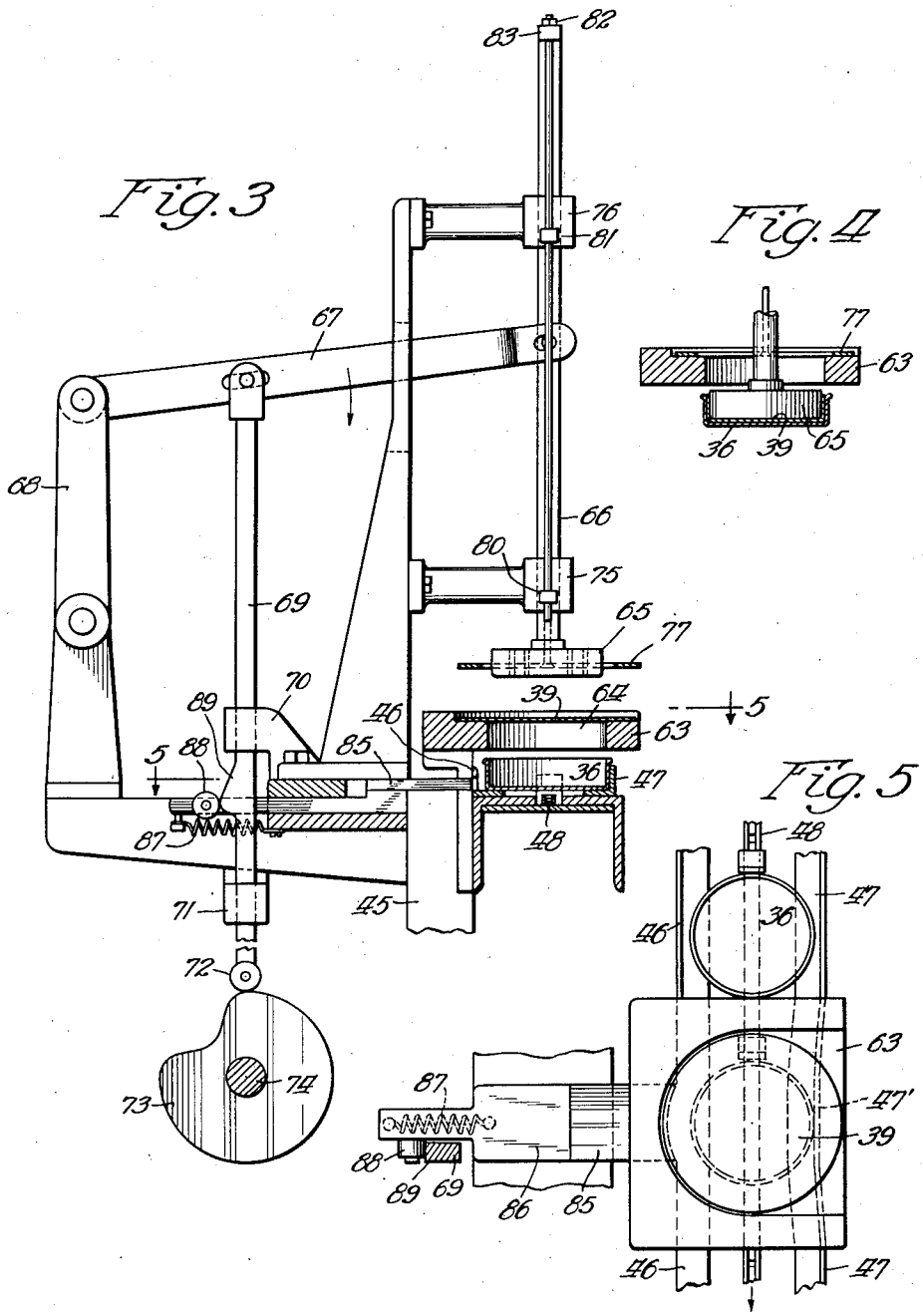

July 28, 1931. A. W. BELL ET AL 1,816,202
PACKAGING METHOD AND APPARATUS
Filed July 14, 1928 7 Sheets-Sheet 3
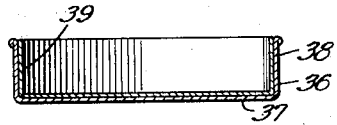
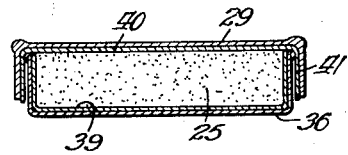
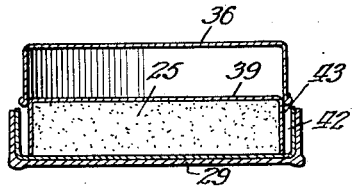
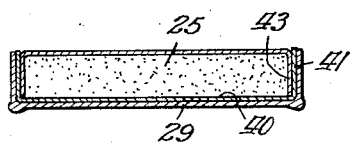
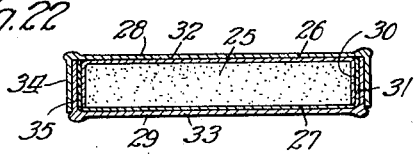
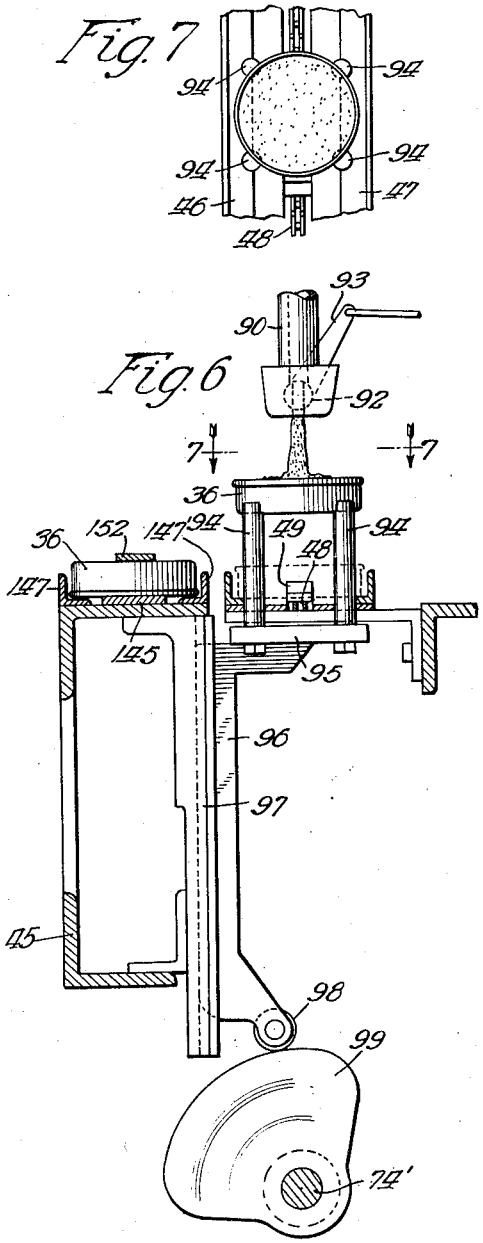
Inventors
Arthur W. Bell
Elmer E. Eldredge
Fisher, Clapp, Soans + Pond Attys

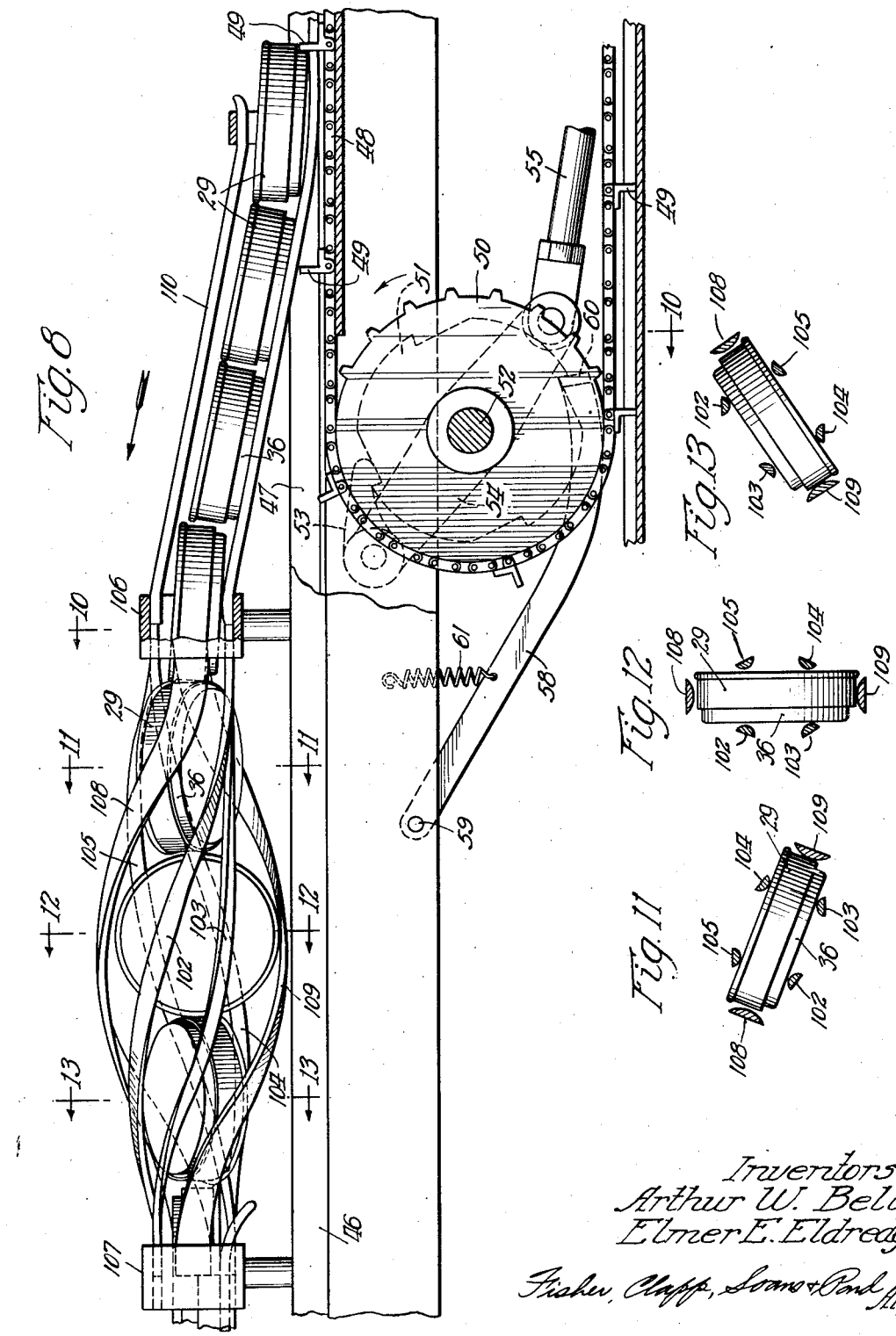

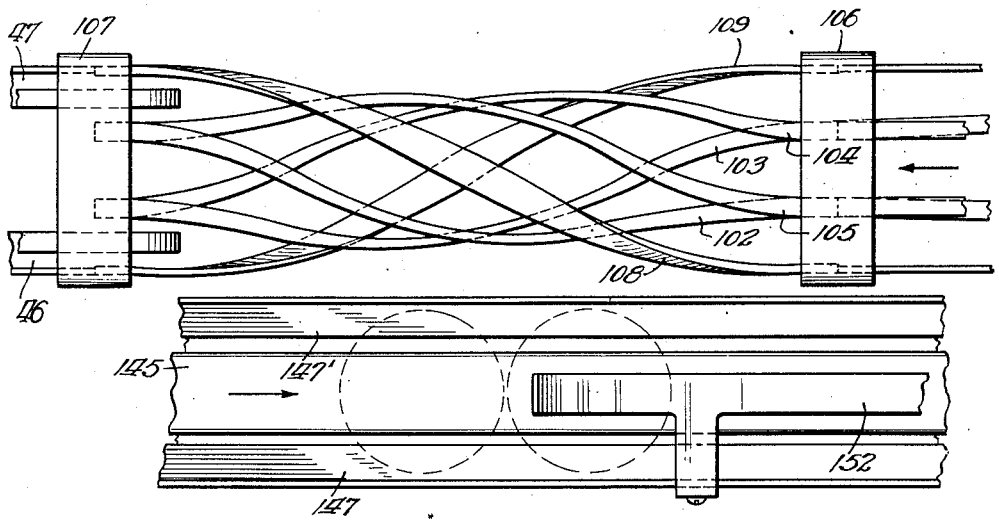
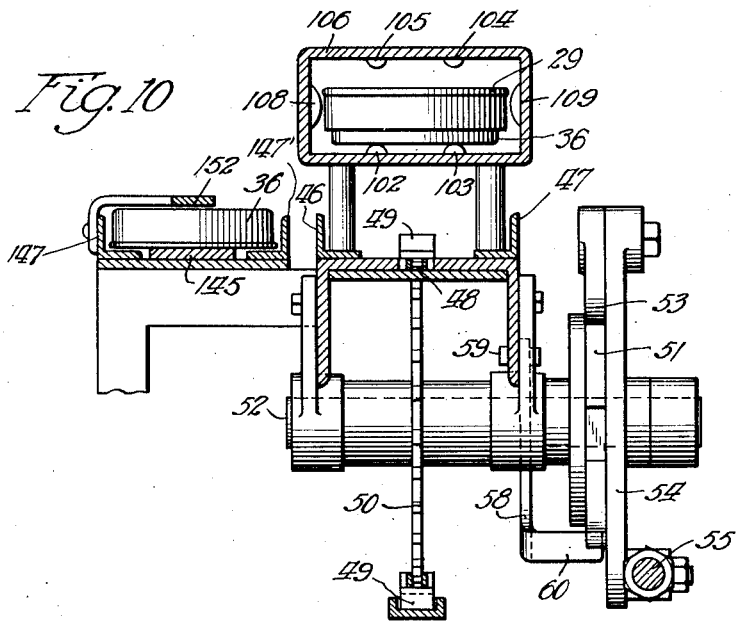

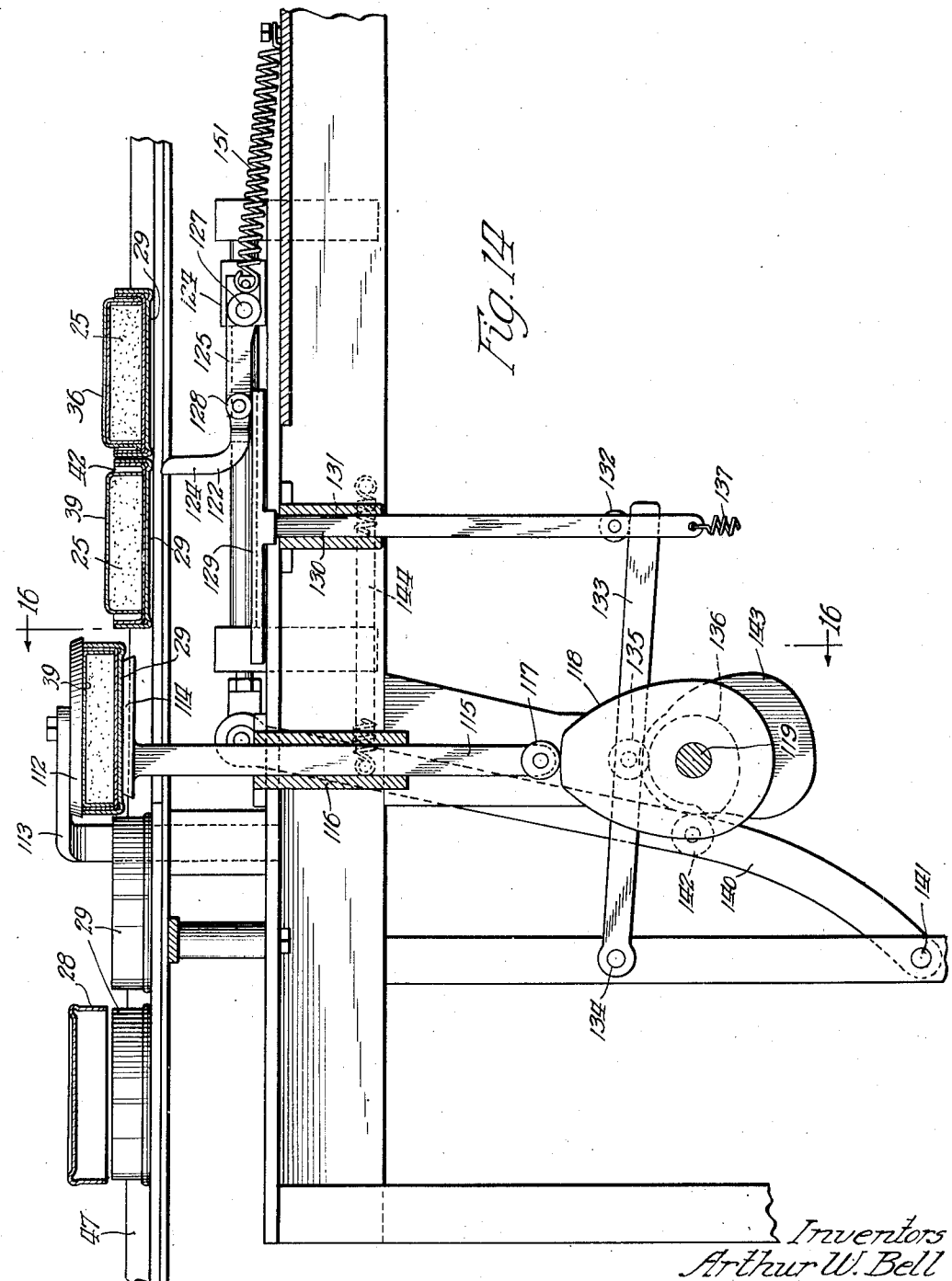

July 28, 1931.  A. W. BELL ET AL  1,816,202
PACKAGING METHOD AND APPARATUS
Filed July 14, 1928  7 Sheets-Sheet 7
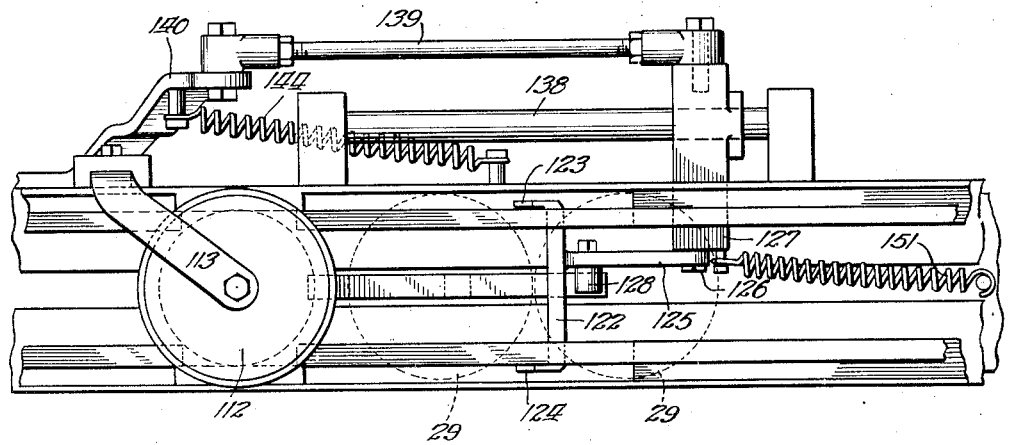
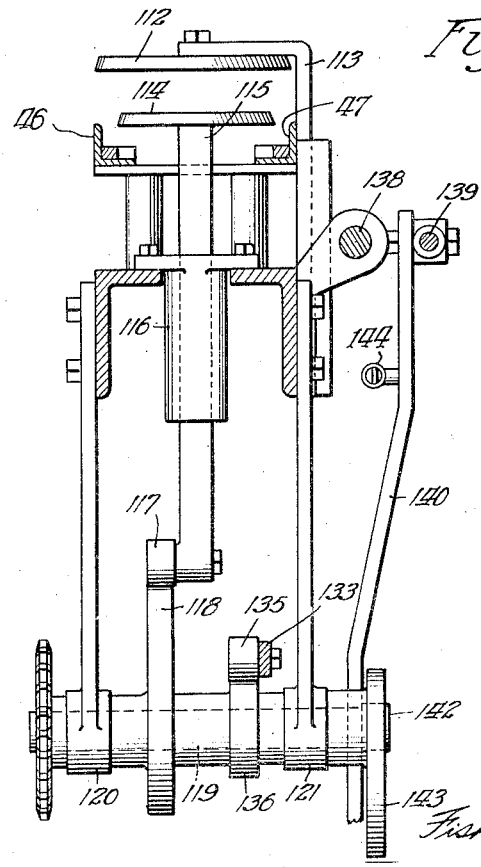
Inventors
Arthur W. Bell
Elmer E. Eldredge Patented July 28, 1931

1,816,202

UNITED STATES PATENT OFFICE

ARTHUR W. BELL, OF CHICAGO, AND ELMER E. ELDREDGE, OF WILMETTE, ILLINOIS, ASSIGNORS, BY MESNE ASSIGNMENTS, TO KRAFT-PHENIX CHEESE CORPORATION, OF CHICAGO, ILLINOIS, A CORPORATION OF DELAWARE

PACKAGING METHOD AND APPARATUS

Application filed July 14, 1928. Serial No. 292,849.

This invention relates to a method and apparatus for making an improved package, and while adaptable to other uses, relates more particularly to a method and apparatus for making packages for food stuff or other material which deteriorates upon exposure to the atmosphere.

The object of the invention, generally stated, is to provide a method of packaging which will result in an improved form of package, particularly adapted for food stuff and the like which deteriorates upon exposure to air and may therefore be termed perishable, the package being such that it will prevent air from reaching the packaged material and thereby preserve the same indefinitely.

Other important and more specific objects of the invention include the provision of a method of packaging which will produce an impervious package of material; a package in which the contents are snugly enclosed in a suitable wrapper; a package in which the wrapper is protected from injury by means of an outer covering or container. Further objects are to provide mechanism for more or less automatically carrying out the improved method; and to provide mechanism which will facilitate rapid and economical packaging of material in the resulting improved form of package.

Other objects and advantages of our invention will be understood by reference to the following specification and accompanying drawings in which we have illustrated our improved package, the method of producing the same, and also a machine for carrying out our improved method.

In the drawings:

Fig. 1 is a side elevation.
Fig. 2 is a plan.
Fig. 3 is a section on the line 3—3 of Fig. 1.
Fig. 4 is a detail showing certain parts of Fig. 3 in a changed position.
Fig. 5 is a section on the line 5—5 of Fig. 3.
Fig. 6 is a section on the line 6—6 of Fig. 1.
Fig. 7 is a section on the line 7—7 of Fig. 6.
Fig. 8 is a side elevation on an enlarged scale of a part of Fig. 1.
Fig. 9 is a plan on an enlarged scale of the part of Fig. 1 shown in Fig. 8.

Figs. 10, 11, 12 and 13 are sections on the lines 10—10, 11—11, 12—12, and 13—13, respectively, of Fig. 8.
Fig. 14 is a section on the line 14—14 of Fig. 2.
Fig. 15 is a plan of the parts shown in Fig. 14.
Fig. 16 is a section on the line 16—16 of Fig. 14, and
Figs. 17, 18, 19, 20, 21 and 22 illustrate the form of package contemplated in the present invention, and each figure illustrates a step in the method of producing the package.

Referring now to the drawings, and particularly to Fig. 22, our improved package includes a quantity of the packaged material indicated at 25 which constitutes the content of the package, an inner wrapper which consists of two pieces 26 and 27 of impervious material, for example, tin-foil, and an outer container including two receptacles 28 and 29 of heavy paper board or other suitable material. The inner wrapper parts 26 and 27 are respectively provided with marginal portions or skirts 30 and 31 which are folded over the outer edge of the packaged material 25, the marginal portion 30 being in intimate engagement with the material 25, and the marginal portion 31 overlapping and being in intimate engagement with the marginal portion 30, as shown in said Fig. 22, so as to provide a substantially air-tight seal between the two sheets 26 and 27, thereby forming a substantially impervious enclosure for the packaged material 25.

The receptacles 28 and 29 which constitute the outer container include bottom and top wall portions 32 and 33 respectively and side wall portions 34 and 35 respectively, which telescope one over the other about the inner wrapped package substantially as shown. The receptacles 28 and 29 are, as above noted, preferably made of heavy paper board or the like, which will be effective to protect the inner wrapper from injury and to maintain the package in the desired shape. As shown in Fig. 22, the inner wrapped package fits snugly in the outer container so that the completed package is compact and therefore does not take up an excessive amount of storage space.

The steps of the method, shown in Figs. 17 to 22 inclusive, for producing the above-described package are as follows:

A relatively rigid receptacle or mold 36, preferably of metal, and including a bottom wall 37 and side wall 38, is provided with a lining 39, the lining being of suitable sheet material such as above mentioned. The side wall 38 of the mold, which in the present instance is circular in form, is slightly tapered so that the inside diameter of the mold is slightly less at the bottom than it is at the open end of the mold. The lined mold is then filled with a suitable quantity of material 25 to be packaged, and another sheet of wrapping material 40, having a marginal portion 41 projecting beyond the outer edge of the mold, is disposed on top of the latter. When packaging some forms of material, the latter will tend to pile up towards the center of the mold as indicated in Fig. 18, and the covering sheet 40 is positioned over the material substantially as shown. In some cases, the sheet 40, being of limp or flexible material, will sag adjacent its periphery so that it will engage the upper edge of the side wall 38 of the mold.

The next step in the method is to insert the covered and filled mold 36 into the receptacle 29 as shown in Fig. 19. When the covered and filled mold is inserted into such receptacle, the marginal portion 41 of the covering sheet 40 is folded downwardly over the outside of the side wall of the mold, thereby, in effect, lining the receptacle 29 with the sheet 40 of wrapping material. The package which at this stage of the method includes the quantity of material 25, linings 39 and 40 and mold 36 and receptacle 29, may for convenience be called a temporary package. This temporary package is next inverted so that the mold 36 is on top, and the receptacle 29 is on the bottom. The mold 36 is then removed from the temporary package, as indicated in Fig. 20, thereby leaving considerable space, indicated at 42, between the side of the wrapper material 25 and the inside of the receptacle 29.

In order to fill up the space 42, pressure is applied to the contents of the receptacle 29 so that the said contents is spread out to fill up the said space and incidentally to reduce the height of the contents of the receptacle to conform to the depth of the latter. By thus spreading the contents of the receptacle 29, the side wall part 43 of the lining 39 is forced outwardly into intimate engagement with the marginal portion or side wall portion 41 of the lining sheet 40 of the receptacle.

The engagement between the said side wall or marginal portions of the lining sheets is such that a substantially air-tight joint is formed between the sheets, the relatively great width of the overlapping marginal portions serving to insure that such a tight joint is formed. When the material has thus been spread to fit snugly in the receptacle 29, a receptacle or cover part 28 may be placed over the open end of the receptacle 29, thereby to form the completed package shown in Fig. 22 hereinbefore described.

The machine which we have illustrated in the accompanying drawings effects some of the above described steps of the method by automatic means, and facilitates manual carrying out of some of the other steps. The machine includes a main frame 45 which is supported by means of suitable supports as shown in Fig. 1.

A pair of tracks or guide members 46 and 47 are carried by the main frame, being secured thereto in any suitable manner and a conveyor chain 48 is arranged intermediate the tracks 46 and 47 for the purpose of propelling the receptacles 36 through various mechanisms for effecting certain of the steps of the method.

The conveyor 48 consists of an endless chain having laterally projecting spaced lugs 49 projecting therefrom, the chain being disposed about sprockets 50 and 51, which are rotatably mounted in any suitable manner on the main frame so as to guide the chain between the tracks 46 and 47. The conveyor is actuated intermittently or step by step so that the receptacles are advanced along the tracks 46 and 47 step by step, thereby permitting the respective steps in the method to be effected when the receptacles are held stationary intermediate steps of movement of the conveyor.

The mechanism for effecting such step by step movement includes a ratchet wheel 51' secured to the shaft 52 to which the sprocket 50 is also secured. A pawl 53 pivotally secured to the outer end of a rock lever 54 is adapted to engage the teeth of the ratchet 51' in a well known manner so as to thereby rotate the sprocket and parts connected thereto a predetermined distance for each oscillation of the rock arm 54. The arm 54 is pivotally mounted intermediate its ends on the shaft 52 and is connected at its lower end to a pitman 55, which, at its other end, is provided with a ring seated on an eccentric member 56 which is fixed to the shaft 57. The shaft 57 may constitute the main drive shaft of the machine or may be driven by any suitable connection to any other rotated part.

It will be obvious to those skilled in the art that the rotating eccentric 56 will effect reciprocation of the pitman 55 and consequently rock the arm 54 and pawl 53 so that the latter will impart step by step rotation to the ratchet 51 and its connected parts, and consequently effect advancement of the conveyor 48 in a step by step movement. An arm 58 pivoted as indicated at 59 to a part of the main frame is provided with a bent end 60, which serves as a dog to engage the teeth of the ratchet 51 to prevent backward rotation of the ratchet. A spring 61 connected between the arm 58 and a part of the main frame normally maintains the free end of the arm 58 in yielding engagement with the periphery of the ratchet so that the dog portion 60 will be effective to drop behind each of the teeth of the ratchet as they pass over the said dog.

Receptacles or molds, such as 36, are fed to the conveyor 48, and are engaged by the lugs 49 so as to be advanced by the conveyor. In Figs. 1 and 2, we have illustrated a receptacle 62 which is adapted to hold a stack of sheets of lining material, and suitable sheet-feeding mechanism 62' is provided for feeding the sheets from the stack, one by one, to a position over the conveyor 48, in which position a mold 36 is held stationary intermediate movements of the conveyor. The details of the above-mentioned sheet-feeding mechanism form no part of the present invention and hence are not herein illustrated or described.

A suitable sheet-feeding mechanism is disclosed in the co-pending application of Arthur W. Bell, Serial No. 280,701. This mechanism feeds a sheet of the lining material onto a support 63, as shown in Fig. 3, which is provided with an aperture 64 of substantially the same diameter as the diameter of the mold 36.

A plunger 65 secured to the lower end of a rod 66 is adapted to be lowered so as to engage the sheet 39 of lining material, and to force the same through the aperture 64 and into the mold 36. The plunger 65 is of such a diameter with respect to the inside diameter of the mold 36 that the lining sheet will be smoothly positioned on the bottom and side wall of the mold, as shown in Fig. 17.

Mechanism for actuating the plunger 65 includes an arm 67 which is connected at one end by means of a pin-and-slot connection to the rod 66, and at its other end is pivotally mounted in a bracket 68, which is connected to the main frame in any suitable manner. A rod 69 is slidably mounted in suitable bearings 70 and 71 which are carried by the main frame, the upper end of the rod 69 being connected to the arm 67 by means of a pin-and-slot connection substantially as shown in Fig. 3. The lower end of the rod is provided with a roller 72, which engages a rotating cam 73 carried by a driven shaft 74. The rotating shaft 74 may be connected by means of gears to the main shaft 57 as shown in Fig. 1.

The cam 73 is so shaped that it will impart vertical reciprocating movement to the rod 69 and thereby, through the agency of the arm 67, effect vertical reciprocation of the rod 66 which is slidably mounted in bearings 75 and 76, which are suitably mounted on the main frame of the machine. An annular holding member 77 is disposed around the plunger 65 and is secured to the lower ends of a pair of guide rods 78 and 79 which are slidably mounted in bearings such as 80 and 81 which are provided on the bearings 75 and 76, respectively.

The upper end of the rods 78 and 79 are provided with heads in the form of nuts 82 which engage the top surface of a crosshead 83 carried by the rod 66. The guide rods 78 and 79 are also slidable through apertures in the crosshead 83. It will be understood that when the plunger 65 is lowered, the weight of the holding member 77 and rods carrying the same will cause the holding member to move downwardly with the plunger until the holding member engages the marginal portion of the sheet of material 39 which is disposed on the support 63. The plunger 65 will then move downwardly independently of the holding member 77 which serves to prevent the sheet 39 from buckling and curling around its outer edge as an incident to the initial part of the forming of the sheet about the plunger 65, when the latter moves through the aperture 64 in the support 63.

It is desirable that the receptacle 36 be fairly accurately aligned with the opening 64 in the support 63 so that the plunger 65 will enter the receptacle without first striking the top edges thereof. For so positioning or aligning the receptacle, the outer track or guide member 47 is offset inwardly as indicated at 47' so that the vertical flange of the track will be effective to position the receptacle as desired.

A slide 85 which is secured to a horizontally slidably plunger 86, is provided for yieldingly urging the receptacle against the said inwardly offset portion 47' of the outer track. The slide member 86 is mounted in a suitable way provided in the main frame structure and is yieldingly urged towards the receptacle by means of a spring 87 which is stretched between the outer end of the member 86 and a fixed part of the main frame as clearly shown in Figs. 3 and 5.

A roller 88 mounted on the slide member 86 adjacent its outer end, is adapted to cooperate with a cam part 89, which may be formed as an integral part of the rod 69. When the rod 69 is lowered, the cam 89 permits the spring 87 to move the slide member 85 and 86 inwardly into engagement with the receptacle to thereby move the receptacle against the said offset portion of the track 47. The inner end of the slide 85 is preferably shaped to fit the periphery of the receptacle as shown in Fig. 5. The operation of the cam 73 and mechanism controlled thereby is so timed with the actuation of the conveyor 48 that the receptacle positioning mechanism and plunger mechanism are actuated during the interval of rest of the receptacle between successive steps of advancement thereof.

The next step in the method of packaging material which has been hereinbefore described, is to fill the lined mold or receptacle with the material to be packaged. The present embodiment of our invention is in connection with a cheese or cheese product packaging machine.

For filling the lined molds with the cheese or cheese product, the molds are advanced by the conveyor 48 to a position beneath the spout or nozzle 90 which for present purposes may be said to be directly connected to the lower end of a vat or hopper 91, which receives a quantity of the material to be packaged, the material being in a liquid state. The nozzle 90 is provided with valve mechanism such as indicated at 92 which may be manually or automatically controlled through the agency of a lever 93 or other suitable means.

When packaging material such as a cheese product, which as in the present case is poured or flown into the mold while in the liquid state, it is desirable to position the mold quite near the end of the nozzle so that there will be but little opportunity for the liquid material to splash from the mold to other parts of the machine. In actual practice we find it desirable to arrange the nozzle or spout 90 at an elevated position above the mold guiding tracks, which position is spaced from the receptacle a greater distance than is desired when the liquid material is poured from the nozzle into the receptacle.

For the purpose of moving the mold into such proximity with the nozzle that there will be practically no splashing when the liquid material is poured into the mold, we provide elevating mechanism which consists in the present instance, of a plurality of pins 94—94 which are positioned relative to each other so that their upper ends will engage the bottom of the mold at peripherally spaced points, the upper ends of the said pins being provided with extensions as clearly shown in Fig. 6, which fit outside of the side wall of the mold so as to prevent lateral displacement thereof. The pins 94 are secured to a plate 95 which is carried by the upper end of a plunger 96, the latter being slidably mounted in a suitable track or guide 97, which is carried by the main frame of the machine. The lower end of the plunger 96 is provided with a roller 98 which engages the periphery of a rotating cam 99 carried by a counter shaft 74' which is driven by the shaft 74 through the agency of gearing, as shown in Fig. 2.

By an inspection of Fig. 6 it will be understood that the cam 99 is effective to raise and lower the plunger 96 and pins 94, thereby to elevate and lower the mold 36 with respect to the nozzle 90. The raising and lowering of the mold 36 is of course effected between steps of advancement of the mold by the conveyor chain 48, and the valve 92 is of course actuated when the mold is held in elevated position.

When the filled and lined mold 36 is lowered from the nozzle 90 into engagement with the conveyor 48, the conveyor is of course effective to further advance the filled mold. The mold is then advanced to a position wherein the covering sheet 40 of lining material is placed over the filled mold. In Figs. 1 and 2 we have indicated a receptacle 100 which is adapted to hold a supply of lining sheets which are to be fed from the receptacle and deposited on top of the filled mold. Any suitable mechanism indicated at 100' for feeding the sheets one by one from the receptacle and depositing the same on the top of the mold may be used, but we prefer to use mechanism such as disclosed in the said copending application of Arthur W. Bell, Ser. No. 280,701. Since the details of this mechanism do not constitute a part of the present invention, it need not be specifically shown and described herein, it being sufficient for present purposes to refer to the said copending application for a description of such mechanism.

After the covering sheet 40 of lining material has been thus positioned over the filled mold, in the manner indicated in Fig. 18, the next step is to place the receptacle part 29 over the top end of the filled mold so as to fold the marginal portion 41 of the lining sheet downwardly over the outside of the mold and to thereby form the package shown in Fig. 19 which for convenience, has been referred to as a temporary package.

In the present embodiment of our invention, the receptacle parts 29 are placed over the filled molds by manual means, the receptacles being supplied to an operator in any suitable manner.

For facilitating removal of the metallic mold 36, we provide a device indicated at 101 for inverting the temporary package so that the mold will be positioned on top. The inverting device 101 is best shown in Figs. 8 to 13 inclusive. This mechanism consists of a plurality of spirally twisted members 102, 103, 104 and 105 which extend between rectangular end members 106 and 107, and are secured thereto. Side guides 108 and 109 also extending between the said end members 106 and 107 and spirally twisted, are provided for guiding the sides of the temporary package. It will be understood from an inspection of Figs. 10 to 13 inclusive, that the members 102, 103, 104, 105, 108 and 109 are so twisted that they cause the temporary package to be inverted as the package is forced through the twisting device.

The packages are delivered to the inverting device from the conveyor 48 by means of an upwardly inclined guide or chute 110 onto which the packages are propelled by the lugs 49 of the conveyor 48. The packages are permitted to abut one another as they enter the chute 110 so that the conveyor 48 is effective to propel the temporary packages through the inverting device as will be readily understood from an inspection of Fig. 8. From the inverting device 101, the temporary packages are delivered through the end member 107 onto a pair of tracks which may conveniently be continuous of the tracks 46 and 47. The temporary packages are of course delivered with the molds on the top so that the same may conveniently be manually removed from the temporary package, or suitable mechanism may be provided for effecting the removal of the molds.

When the mold is removed from the temporary package, the space indicated at 42 in Fig. 20 is left between the wrapped material 25 and the side wall of the receptacle 29. The mechanism for applying pressure to the wrapped material so as to spread the same to fill up the said space in the receptacle, is best shown in Figs. 1, 2, 14, 15 and 16.

The pressure applying or squeezing mechanism includes a stationary plate member 112, which is secured to a bracket 113, the latter being vertically adjustably secured in any suitable manner, to a part of the main frame. A coacting vertically reciprocable plate 114 is carried by the upper end of a plunger rod 115, the latter being slidably mounted in a suitable bearing 116, which is secured to the main frame in any suitable manner. The lower end of the plunger 115 is provided with a roller 117 which engages the periphery of a rotating cam 118 carried by the shaft 119, which is journaled in suitable bearing brackets 120 and 121 supported by the main frame. The shaft 119 may be continuously rotated by means of a chain which extends over suitable sprockets secured to the shaft 119 and to the drive shaft 57, substantially as diagrammatically indicated in Fig. 1. The weight of the plate 114 and plunger rod 115 is sufficient to normally urge the plate and plunger to move downwardly so that the roller 117 is maintained in operative engagement with the periphery of the cam 118. From an inspection of Figs. 14 and 16, it will be obvious that the cam 117 is effective to raise and lower the plate 114.

The filled receptacles 29 in which the content is spaced from the side wall are fed along the tracks 46 and 47 to a position over the plate 114 when the latter is in its down position. The mechanism for feeding the receptacles to such position includes a U-shaped member 122 having spaced arms 123 and 124 which are adapted to engage the receptacle at spaced points, as will be understood by an inspection of Fig. 15. The U-shaped member 122 is secured to an arm 125 which is pivotally mounted as shown at 126 on a crosshead 127. The arm 125 adjacent the U-shaped bracket is provided with a roller 128 which rests on a vertically reciprocable track 129, which is secured to the upper end of a plunger rod 130, the latter being mounted in a suitable bearing 131 carried by the main supporting frame. The lower end of the plunger 130 is provided with a roller 132 which engages the upper side of a lever 133 which is pivoted as shown at 134 on a convenient part of the main frame. Intermediate its ends, the lever 133 is provided with a roller 135 which engages a cam 136. The latter is secured to the shaft 119 and rotates therewith, and obviously is effective to oscillate the lever 133 and thereby to raise and lower the plunger 130 and track 129. A spring 137 stretched between the lower end of the plunger 130 and any convenient stationary part of the machine insures downward movement of the plunger and track when permitted by the cam 136.

The crosshead 127 is reciprocably mounted on a rod 138 which is supported by the main frame in any suitable manner. Mechanism for reciprocating the crosshead 127 and thereby advancing and retracting the U-shaped member 122 includes a connecting rod or link 139, which is pivoted at one end to the crosshead 127 and at its other end to the upper end of an arm 140. The arm 140 extends downwardly and is pivoted at its other end as shown at 141 on a stationary part of the machine and is provided intermediate its ends with a roller 142 which engages the periphery of a cam 143. The cam 143 is carried by the shaft 119, and is secured thereto so as to rotate in unison therewith, and in unison with the cams 118 and 136. A tension spring 144 is provided for normally urging the arm 140 to the right in Fig. 14, thereby to maintain the roller 142 in operative engagement with the cam 143.

The cams 118, 136 and 143 are so arranged that the cam 136 is first operative to raise the track 129, thereby to elevate the U-shaped member 122 so that its arms 123 and 124 enter the spaces between the adjacent receptacles 29—29. (See Fig. 15.) The cam 143 is next operative to advance the U-shaped member, thereby to feed the receptacle 29 in front of it into the position above mentioned over the plate 114. A tension spring 151, stretched between a fixed point on the main frame and the crosshead 127 serves to normally urge the crosshead to its initial position, as shown in Fig. 15, in cooperation with the spring 144. The cam 118 is then operative to raise the plate 114 thereby raising the filled receptacle 29 into engagement with the top plate 112. The extent of upward movement of the plate 114 is such that the content of the receptacle will be squeezed and caused to spread out and fill the space 42, which heretofore was present in the receptacle. The cam 118 is of course effective to permit the plate 114 to be lowered so that the filled receptacle 29 may be further advanced along the tracks 46 and 47. Obviously repetition of the above described feeding movement for the receptacles 29 will be effective to force the receptacle over the plate 114 forwardly as an incident to the advancement of the next receptacle.

The filled receptacles 29 which are thus delivered to the delivery end of the tracks 46 and 47 are then ready to receive the cover receptacle portion 32, the same may conveniently be applied by manual means while the filled receptacle remains on the tracks and is thereafter propelled to any other desirable place by means of a suitable conveyor or the filled receptacle may be removed from the tracks and the cover applied, after which the completed package may be disposed of as desired.

The molds 36 which are removed from the temporary packages after the same have been inverted by the inverting device indicated at 101, may conveniently be returned to the other end of the machine for repeated use. The means for returning the molds may comprise a conveyor 145 which extends around pulleys 146 and 146′, the latter being rotatably supported by suitable bearings provided on the main frame of the machine. The conveyor 145 is preferably disposed between a pair of tracks 147 and 147′ which are operative to guide the molds as they are propelled by the conveyor 145. In practice, we find that it is convenient to deposit the molds in inverted position in which they are removed from the temporary packages. Another inverting device indicated at 148 may be provided in the path of the empty returning molds 36. The inverting device 148 is operative to deliver the empty molds in upright position to the conveyor 145 adjacent its discharge end. Curved guides 149 and 150, forming in effect a chute, may be provided for guiding the empty molds onto the conveyor 48, which will pick up the empty molds, and again advance them through the various steps in our improved method of packaging material. The conveyor 145 may be continuously driven in any suitable manner from any driven shaft of the machine, for example, as diagrammatically indicated in Fig. 1. A retaining member 152 extending lengthwise of the conveyor 145 may be provided for maintaining the empty molds 36 in engagement with the conveyor so that the same will be operative to return the molds as described.

While we have described our process for packaging material in connection with the packaging of a cheese product, we wish it to be understood that our invention is not limited to such use, since other materials may also be put up in packages such as above described, and by use of the above described method and apparatus.

We are aware that changes may be made in the above described package, the method of producing the package, and also in the mechanism for carrying out the method without departing from the spirit of our invention, the scope of which should therefore be determined by reference to the following claims, the same being construed as broadly as possible consistent with the state of the art.

We claim as our invention:

1. The method of packaging material which consists in flowing the material into a rigid open-topped walled receptacle having its bottom and its side wall lined with sheet wrapping material, then disposing over the open top of the receptacle another sheet of wrapping material, forming on said latter sheet a peripheral flange extending towards the bottom of the receptacle but outside of the latter, and then effecting removal of the receptacle.

2. The method of packaging material which consists in flowing the material into a rigid open-topped walled temporary receptacle having its bottom and its side wall lined with sheet wrapping material, then disposing over the open top of the receptacle another sheet of wrapping material, forming on said latter sheet a peripheral flange extending towards the bottom of the receptacle but outside of the latter and overlapping the side wall of the first sheet, removing said receptacle and applying a second receptacle, and then expanding the wrapped contents to fit said second receptacle.

3. The method of packaging material which includes the steps of lining an open-topped, rigid, walled mold with wrapping material, filling the lined receptacle with the material to be packaged, covering the open end of the receptacle with another sheet of wrapping material, inserting the covered mold, top first, into an open-topped receptacle, removing the mold, and then expanding the contents of the receptacle to snugly fit the latter.

4. The method of packaging material which consists in lining the bottom and side wall of the mold with sheet wrapping material, filling the lined mold with the material to be packaged, covering the top of the filled mold with a sheet of wrapping material having a marginal portion projecting beyond the edge of the mold, inserting the filled and covered mold, top first, into a receptacle including a bottom wall and a side wall, the side wall of said receptacle being effective to fold said marginal portion over the outside of the side wall of said mold, removing the mold, and then applying pressure to the top of the wrapped material in said receptacle, thereby to spread the material to cause the same to fill the space left in said receptacle by removal of said mold, the side wall of said mold lining sheet being incidentally forced into intimate engagement with said covering sheet marginal portion.

5. The method of packaging plastic material which consists in lining a walled mold with desired sheet wrapping material, pouring the material while in a fluid state into the lined mold, placing a sheet of wrapping material over the top of the filled mold with marginal portions of said sheet projecting beyond the edges of the mold, inserting the mold, top first, into an open-ended receptacle comprising a bottom wall and a side wall, the side wall of said receptacle being effective to fold the marginal portions of said sheet over the outside of the side wall of the mold, removing the mold, then applying pressure on top of the material in said receptacle so as to spread the material to fill the space left in the receptacle by removal of said mold, and then closing the open end of the receptacle.

6. The method of packaging material which consists in lining the bottom and side walls of a walled mold with sheet wrapping material, filling the lined mold with the material to be packaged, covering the top of the filled mold with a sheet of wrapping material, said sheet having a marginal portion projecting beyond the outer edge of the mold, inserting the filled and covered mold, top-first, into an open-ended container including a bottom wall and a side wall, the side wall of said container being effective to fold said projecting marginal portions of the covering sheet over the outside of the side wall of the mold, thereby, in effect, lining the bottom and side wall of said container with said wrapping material, removing the mold, thereby leaving a wrapped package in said lined carton, then applying pressure to the top of said package to spread the same in said container so as to cause the cake to fit snugly therein, and then closing the container.

7. The method of packaging material which consists in lining a walled mold with sheet wrapping material, filling the lined mold with the desired quantity of material to be packaged, placing a lined, open-topped, walled container downwardly over the filled mold, removing the mold thereby leaving a space in said container between the packaged material and the container wall, and then expanding the contents of the container, thereby causing the contents to fill up said space.

8. The method of packaging material which consists of propelling, step by step, an open-topped mold comprising a bottom wall and a side wall, automatically, intermediate successive steps of propulsion, lining the bottom wall and side wall of said mold with sheet material desired for enclosing the packaged material, automatically filling the lined mold with the desired quantity of cheese while the mold is stationary intermediate succeeding steps of propulsion, covering the filled mold with a sheet of the said enclosing material, placing a container downwardly over the filled and covered mold, then inverting the carton and its contents as an incident to the travel thereof, removing the mold, whereby a space is left in said container between the wall thereof and the side of the wrapped material, and then, intermediate succeeding steps of travel, applying pressure to the top of the contents of the container to spread such contents, thereby to cause the same to fill up said space.

9. In a machine for packaging material, the combination of a conveyor for propelling a receptacle, means for actuating said conveyor step by step, means operative intermediate steps of movement of said conveyor to line the receptacle with sheet wrapping material, means also operative intermediate steps of movement of said conveyor to deposit the material to be packaged in said lined receptacle, means for placing a sheet of wrapping material over the top of the filled receptacle so as to cover the same, said filled and covered receptacle being adapted to receive an open-ended container thereover, said container serving with said receptacle to form a temporary package, means for inverting the temporary package, thereby to facilitate removal of said receptacle, and means for spreading the contents of the container after said receptacle is removed, thereby to cause said material to fill up the space left in said container by removal of said receptacle.

10. In a machine for packaging material, the combination of a conveyor for propelling a receptacle, means for actuating said conveyor step by step, means operative intermediate steps of movement of said conveyor to line the receptacle with sheet wrapping material, means also operative intermediate steps of movement of said conveyor to deposit the material to be packaged in said lined receptacle, means for placing a sheet of wrapping material over the top of the filled receptacle so as to cover the same, said filled and covered receptacle being adapted to receive an open-ended container thereover, said container serving with said receptacle to form a temporary package, means for inverting the temporary package, thereby to facilitate removal of said receptacle, means for spreading the contents of the container after said receptacle is removed, thereby to cause said material to fill up the space left in said container by removal of said receptacle, and means for conveying said removed receptacles from the position in which they are removed to the lining mechanism, preparatory to relining the receptacle for further use.

11. In a machine for packaging plastic material, the combination of means for advancing a receptacle step by step, means for lining the receptacle with sheet material intermediate steps of advancement of the receptacle, means for filling the lined receptacle with said plastic material, said means being also operative intermediate steps of advancement of said receptacle to cover said filled receptacle with a sheet of covering material having a marginal portion projecting beyond the outer edge of said receptacle, said covered receptacle being adapted to receive thereover a downwardly facing, open-ended, walled container, the wall portion of said container being effective, when the container is placed over the receptacle, to fold said marginal portion of the covering sheet downwardly over the outside of said receptacle, thereby forming a closed temporary package adapted to be further advanced by said advancing means, means operative as an incident to such further advancement of the temporary package for inverting the same, thereby facilitating removal of said receptacle, means for applying pressure to the contents of said container so as to spread said contents, thereby causing the same to fill up the space left in said container by removal of the receptacle.

12. In a machine for packaging plastic material, the combination of means for advancing a receptacle step by step, means for lining the receptacle with sheet material intermediate steps of advancement of the receptacle, means for filling the lined receptacle with said plastic material, said means also being operative intermediate steps of advancement of said receptacle to cover said filled receptacle with a sheet of covering material having a marginal portion projecting beyond the outer edge of said receptacle, said covered receptacle being adapted to receive thereover a downwardly facing, open-ended, walled container, the wall portion of said container being effective, when the container is placed over the receptacle, to fold said marginal portion of the covering sheet downwardly over the outside of said receptacle, thereby forming a closed temporary package adapted to be further advanced by said advancing means, means operative as an incident to such further advancement of the temporary package for inverting the same, thereby facilitating removal of said receptacle, a pair of relatively fixed and movable presser members normally spaced apart for receiving said container and its contents therebetween, means for feeding said containers and their contents one by one between said presser members, and means for actuating said presser members so as to cause the same to squeeze the contents of said container, thereby to spread the same so as to cause said contents to fill up the space left in the container by removal of said receptacle.

13. In a machine for packaging plastic material, the combination of means for advancing a receptacle step by step, means for lining the receptacle with sheet material intermediate steps of advancement of the receptacle, filling means, spaced upwardly from the path of travel of said receptacle, for supplying material in the fluid state to the lined receptacle, means for elevating the lined receptacle into a position adjacent said filling means so as to facilitate filling of the receptacle with said material in the fluid state, said elevating-and-filling means also being operative intermediate steps of advancement of said receptacle, another means operative intermediate steps of advancement of said receptacle, for covering the filled receptacle with a sheet of covering material having a marginal portion projecting beyond the outer edge of said receptacle, said covered receptacle being adapted to receive thereover a downwardly facing, open-ended, walled container, the wall portion of said container being effective, when the container is placed over the receptacle, to fold said marginal portion of the covering sheet downwardly over the outside of said receptacle, thereby forming a closed, temporary package adapted to be advanced by said advancing means, means operative as an incident to advancement of the temporary package for inverting the same, thereby facilitating removal of said receptacle, means for applying pressure to the contents of said container so as to spread said contents, thereby causing the same to fill up the space left in said container by removal of the receptacle.

ARTHUR W. BELL.
ELMER E. ELDREDGE.